March 15, 1938.　　　H. S. VICÉ　　　2,111,198
OPTICAL DRAWING DEVICE
Filed March 18, 1935　　　2 Sheets-Sheet 2
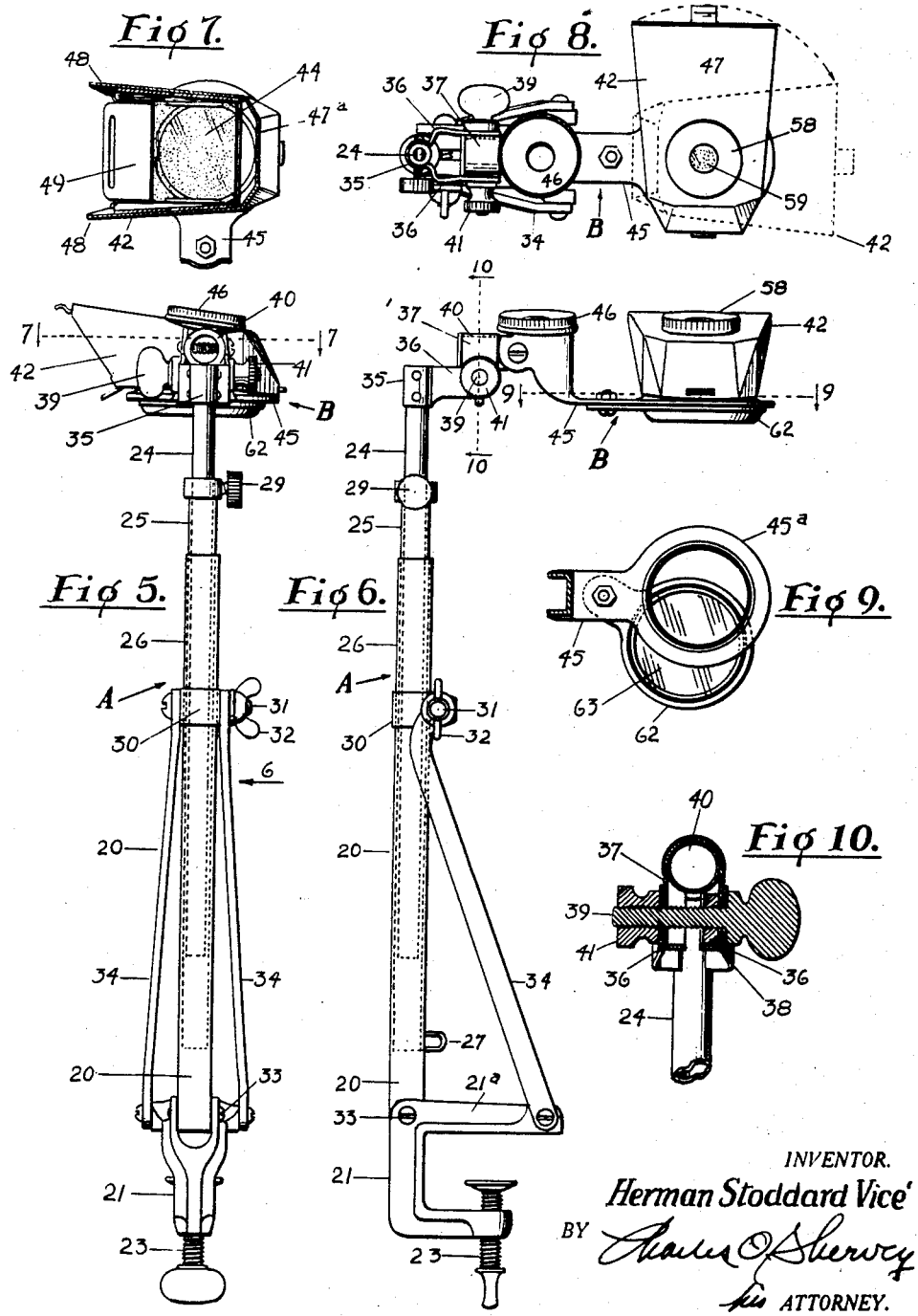
INVENTOR.
Herman Stoddard Vicé
BY
his ATTORNEY.

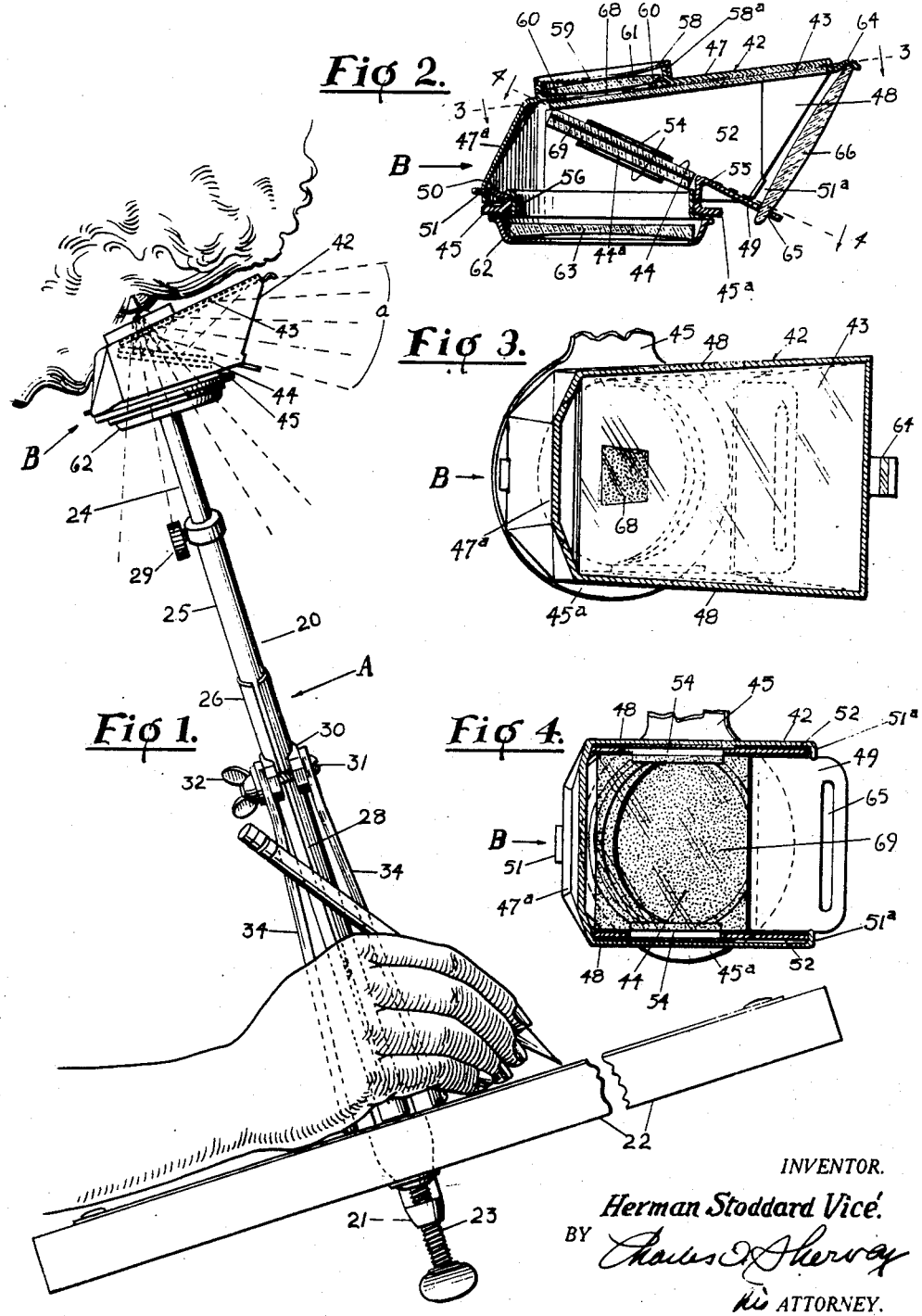

Patented Mar. 15, 1938

2,111,198

UNITED STATES PATENT OFFICE 2,111,198

OPTICAL DRAWING DEVICE

Herman Stoddard Vicé, Chicago, Ill.

Application March 18, 1935, Serial No. 11,573

6 Claims. (Cl. 88—75)

This invention relates to optical drawing devices, and the principal object of the invention is to provide an optical member having a system of mirrors or reflector plates adapted to be supported above a drawing board, and arranged to reflect the image of the object (which is to be copied) through a sight opening to the eye of the user, so that while looking through the sight opening, the user sees the drawing paper with the image of the object appearing as though superimposed thereon, whereby the user may readily trace or draw the image upon the drawing paper.

Another object is to provide one of the reflector plates with a light transmitting portion therein, whereby the field viewed on the drawing paper is visible around the light transmitting portion, and also to provide another reflector plate having a reflecting surface, electrically or chemically deposited thereon, or otherwise applied thereto in such manner as to provide a reflecting surface which is partially transparent, whereby the user may look through the same and see the drawing paper below, with the image of the object (reflected by said partially transparent reflector) having the appearance of being superimposed upon the drawing paper.

In accordance with the present invention, the entire field is visible, and the user may trace any portion of the image and may shift his drawing tool from place to place on the drawing as is found most convenient in copying the object.

Another object is to provide swivel connections between the housing of the optical member and a standard, whereby to adjust the optical member into proper relation with respect to the drawing paper and object to be copied. Another object is to provide lens mounts and lenses in connection with the reflectors.

With these and other objects and advantages in view, this invention consists in the several novel features hereinafter fully set forth and claimed.

The invention is clearly illustrated in the drawings accompanying this specification in which:

Fig. 1 is a side elevation of an optical drawing device embodying a simple form of the present invention and showing the same in position for copying an object upon a sheet of drawing paper;

Fig. 2 is a detail vertical longitudinal section through the optical member of the device;

Fig. 3 is a detail section taken on the line 3—3 of Fig. 2;

Fig. 4 is a detail section taken on the line 4—4 of Fig. 2;

Fig. 5 is a side elevation of the device looking at the reverse side from that seen in Fig. 1;

Fig. 6 is a front elevation of the device looking in the direction of the arrow 6 in Fig. 5;

Fig. 7 is a fragmental section taken on the line 7—7 of Fig. 5;

Fig. 8 is a plan of the device;

Fig. 9 is a detail horizontal cross section taken on the line 9—9 of Fig. 6, and Fig. 10 is a detail vertical section taken on the line 10—10 of Fig. 6.

Referring to said drawings, the reference character A designates a support and B the optical member of the device. The support comprises a standard 20 having a base or clamp 21 by which it may be mounted upon a table or drawing board 22. In accordance with the common practice, the drawing board is supported in a slightly inclined position as is seen in Fig. 1. The clamp shown is of the usual U shape having a clamp screw 23 by which it is clamped to the drawing board. Desirably, the standard is extensible and contractable and as shown, is composed of telescopic tubes 24, 25, 26. The inner tube 25 has a tongue or lug 27 upon its lower end, which travels in a slot 28 formed in and extending lengthwise of the outer tube 26, whereby to hold the telescopic tubes 25, 26 against relative rotation. A set screw 29 threaded in a collar or enlargement formed on the tube 25 and adapted to bear against the tube 24, and a split clamp collar 30 slidably mounted on the tube 26, together with a clamp screw 31 and wing nut 32 provide means for holding the telescopic tubes in any angular and lengthwise position of adjustment. In practice, the clamp 21 is fastened at one edge of the drawing board, and inasmuch as the optical member B should be directly over the drawing paper upon which the drawing is to be made, the standard is fulcrumed upon the clamp 21 to enable it to be tilted over the drawing board, whereby to bring the optical member directly over the same at any point desired. The standard is fulcrumed to the clamp by a pin or screw 33 extending through ears on the clamp and through the lower end of the standard, and means, such as brace rods 34 are provided for bracing the standard in any position of angular adjustment. The brace rods are fulcrumed upon an arm 21$^a$ of the clamp at a point distant from the fulcrum for the standard, and are connected to the clamp collar 30 by the clamp screw 31 and wing nut 32. To adjust the standard, the wing nut is backed off slightly, the standard adjusted to proper position and the wing nut screwed up tight.

The optical member B is adjustably secured to the support A by swivel connections which will now be described. Secured to and projecting laterally from the tube 24 is a clip 35 formed with a pair of ears 36 between which is an inverted U shaped clamp member 37 (see Fig. 10) containing a non-rotatable nut 38 in which is threadedly mounted a clamp screw 39 that extends through the ears 36 and the two forks of the U clamp member 37. This arrangement provides means for adjusting the optical member angularly in a vertical plane. A stud shaft or pin 40 to which the optical member is fastened, is rotatively held in the U bend of the clamp member 37, whereby the optical member may be rotated on the axis of the stud shaft or pin 40. A clamp nut 41 threaded on the clamp screw 39 and bearing against the side of one ear 36 of the clip 35 provides means for tightening the U clamp member 37 upon the stud shaft 40. In use, the optical member is adjusted upon its swivel connections with the standard to bring the axis of the sight opening into a line perpendicular to the drawing board.

In its preferred form, the optical member B comprises a housing 42, mirrors or reflector plates 43, 44 therein and suitable mountings for lenses as will be hereinafter explained. The housing is swiveled on a supporting arm 45 to which the stud shaft 40 is attached, and said arm is desirably provided with a blind mounting 46 spaced from the hereinafter mentioned lens mounting on the housing, a distance corresponding to the distance between the eyes of a human being.

The housing 42 has an opening at one end through which light rays enter the housing and are reflected by the mirrors, and also has openings in its top and bottom walls through which the user views the image. For convenience in assembling the parts the housing comprises top and bottom sections detachably secured together. As shown the top section comprises a top wall 47, side walls 48 and an end wall 47ª. The lower section comprises an inclined bottom wall 49, an annular base 50 and upstanding wings or walls 52 that extend upward between and adjacent the side walls 48 of the top section. A tongue 51 on the base 50 engages in a slot in the end wall 47ª and tongues 51ª on the lower front corners of the side walls 48 lie in front of the front edges of the wings 52 and hold the two sections together. The arm 45 has a ring like enlargement 45ª on its end, and the annular base 50 is swiveled thereon by a flanged ring 56.

The mirror or reflector plate 43 is held between the lower face of the top wall 47 and the upper edges of the wings 52 and the mirror or reflector plate 44 is held between and supported by flanges 54 that project inwardly from the wings 52 and extend in an inclined direction. The lower end of the mirror 44 bears against a shoulder 55 at the upper end of the bottom wall 49.

The opening in the top wall 47 of the housing is covered by a centrally apertured flanged cover 58 which slips upon an upstanding annular flange 58ª on the top wall 47. The aperture 59 of the cover, provides a sight opening in the housing through which the image reflected by the mirrors is visible and through which the drawing paper below is visible. A shoulder 60 is provided on the top wall of the housing below the cover 58 to support a lens 61 which is confined thereon by the cover 58. Desirably a lens mounting ring 62 is swiveled upon the supporting arm 45 in which may be placed a lens 63 which co-operates with the lens 61 to equalize the focal distances. A lens mounting 64, 65 for an enlarging or reducing lens 66 may be provided at the open end of the housing for enlarging or diminishing the size of the image reflected. The lenses are not required, but they are provided for aiding persons who use eye glasses and also for the purpose of enlarging or diminishing the size of the image of the object to be drawn.

The mirror or reflector plate 43 may comprise a plane mirror or other transparent plate backed with silver or other reflecting material. Directly below or in line with the sight opening 59, the reflecting material of the reflector plate 43 is omitted so as to leave a clear area 68 whereby light rays may pass through the transparent area of the mirror or reflector plate 43 to the eye of the user, so that a person looking through the sight opening may see the image reflected by the mirror or reflector plate 44.

The mirror or reflector plate 44 is coated on one side with a partly transparent reflecting material 69, such as a very light film of silver or other suitable reflecting material, either electrically or chemically deposited on the transparent plate in such manner that the mirror serves to reflect images and also enables one to see through the film and view the drawing below. The coating on the reflector 44 may be in the nature of a thin film having the property of reflecting an image and being sufficiently transparent to permit the drawing paper below it to be seen through it. A transparent plate 44ª is adhesively secured to the reflector plate 44 on the side which contains the reflecting film and serves as a protection for the thin film.

The two mirrors or reflector plates 43, 44 are angularly disposed at an angle which gives the best results and I have found that such an angle is one of approximately 33 degrees. Rays of light entering through the end opening of the housing (as indicated by the broken lines a in Fig. 1) are reflected by the upper mirror or reflector plate 43 upon the lower mirror or reflector plate 44 and by the latter are reflected back through the clear area 68 in the upper reflector plate to the eye of the user, thereby producing an image of the object to be drawn, which image appears to be superimposed upon the drawing paper below, and inasmuch as the eye of the user sees the drawing paper below with the image apparently superimposed thereon, and also sees the pencil or other drawing instrument used by him to copy the object, he can readily trace or draw the picture by following the lines, shades and shadows that appear to be superimposed upon the drawing paper.

In use, the device is secured in place upon the drawing board and the optical member is properly adjusted above the drawing paper, the object to be copied being placed at a suitable distance away from the device. The user looks through the sight opening and traces, marks or draws in the image reflected by the mirrors and which appears to be superimposed upon the drawing paper. The clear space on the upper reflector plate enables the user to obtain a view of the whole field upon the drawing board and the transparent reflector plate enables the user to see the entire surface of the drawing paper. The parts are so constructed and arranged that the device may be folded into compact form and placed in a suitable case. The transparent reflector plate 44 appears to be transparent throughout its entire area as distinguished from reflector plates that have alternate transparent and reflecting portions. In other words the transparency appears continuous throughout the reflector.

I claim as new and desire to secure by Letters Patent:

1. An optical drawing device, comprising a housing having a top, bottom, sides and one end wall, the other end being open, there being a sight opening in the top and a relatively large opening in the bottom, separated from the open end by a cross wall, a reflector plate in the housing having a light transmitting portion therein aligned with the sight openings in the housing, a transparent reflector plate in the housing, angularly disposed with respect to the first mentioned reflector plate and having a thin transparent reflecting film on one side thereof extending throughout its entire exent, whereby light rays may pass from below through said aligned openings, and a transparent plate secured on the side of the transparent reflector plate containing the thin film, whereby to protect said film, said first mentioned reflector plate serving to reflect an image upon the second mentioned reflector plate, and the latter serving to reflect the image through the sight opening in the top of the housing.

2. An optical drawing device, comprising a housing having a top, bottom, sides and one end wall, the other end being open, there being a sight opening in the top and a relatively large opening in the bottom separated by a wall from the open end of the housing, a supporting arm having a large opening therein at one end disposed coaxially with the opening in the bottom of the housing, the housing being swiveled on said arm at the opening therein, a reflector plate in the housing disposed adjacent the top and having a light transmitting portion in line with the openings in the top and bottom, and a transparent reflector plate in the housing angularly disposed with respect to the first mentioned reflector plate and extending across the opening in the bottom of the housing.

3. An optical drawing device, comprising a housing having a top, bottom, sides and one end wall, the other end being open, and the top extending forward beyond the bottom, there being a sight opening in the top adjacent the end wall and a relatively large opening in the bottom aligned with the sight opening and separated from the open front end by a wall, a lens mount on the top having a sight opening in line with the openings in the top and bottom, and a lens mount under the opening in the bottom, lenses removably held in said lens mounts, a reflector plate in the housing disposed adjacent the top and having a light transmitting portion in line with the aligned openings in the top and bottom, and a transparent reflector plate angularly disposed with respect to the first mentioned reflector plate and extending across the opening in the bottom of the housing, both of said reflector plates being contained entirely within the housing.

4. An optical drawing device, comprising a housing composed of a top lens holder having an opening therein, a bottom lens holder having an opening parallel with and aligned with the opening in the top lens holder, lenses removably held in said lens holders, a top wall extending from the top lens holder side walls and one end wall connecting said lens holders, a reflector plate parallel with and supported underneath the top wall of the housing, said reflector having a light transmitting portion in its reflecting surface in alignment with the openings in the top and bottom lens holders, and a transparent reflector extending from the inner end of the first mentioned reflector and at an angle thereto across the bottom opening, both of said reflector plates being contained entirely within the housing.

5. An optical drawing device, comprising a housing having a top, bottom, sides and one end wall, the other end being open, and there being aligned sight openings in the top and bottom, a support connected to the housing for supporting the same in spaced relation to a drawing board, upper and lower angularly disposed reflector plates contained entirely within the housing and extending across said sight openings, the upper plate having a light transmitting portion aligned with the sight openings in the housing, and the lower reflector plate being transparent, a lens removably mounted at the open end of the housing, and a lens at the lower sight opening.

6. An optical drawing device, comprising a housing having a top, bottom, sides and one end wall, the other end being open, there being a sight opening in the top and a relatively large opening in the bottom, upper and lower lens mounts adjacent said openings, and lenses removably mounted in said lens mounts, a plate mounted in said housing and having a reflecting surface and having also a light transmitting portion aligned with the sight opening in the housing, a transparent plate mounted in said housing in angular relation to the first mentioned plate and having a transparent reflecting surface throughout its entire extent through which light rays may pass from below, to and through said light transmitting portion, the transparent reflecting surface thereof serving to reflect through said sight opening an image reflected by the first mentioned reflector plate, and both of said plates being contained entirely within the housing.

HERMAN STODDARD VICÉ.